(No Model.)
W. R. WATT.
MILK PAIL.
No. 489,352. Patented Jan. 3, 1893.
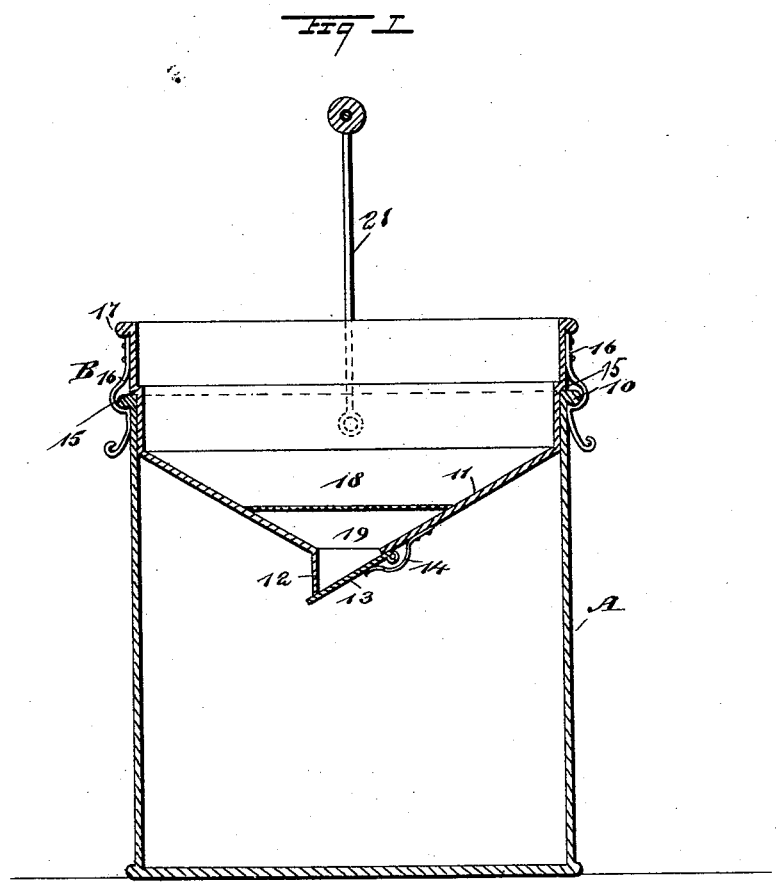

UNITED STATES PATENT OFFICE.

WILLIAM R. WATT, OF SOMERVILLE, TENNESSEE.

MILK-PAIL.

SPECIFICATION forming part of Letters Patent No. 489,352, dated January 3, 1893.

Application filed April 4, 1892. Serial No. 427,636. (No model.)

*To all whom it may concern:*

Be it known that I, WILLIAM R. WATT, of Somerville, in the county of Fayette and State of Tennessee, have invented a new and useful Improvement in Milk-Pails, of which the following is a full, clear, and exact description.

My invention relates to an improvement in milk pails, and has for its object to provide a pail or milk bucket so constructed that a removable strainer may be expeditiously and conveniently combined therewith, in such a manner as to strain the milk as fast as it is milked or poured into the pail or bucket; and a further object of the invention is to provide a valve beneath the strainer capable of automatically opening to permit milk from the strainer to pass into the pail, but which in the event that the pail is turned over will remain closed and thus preserve the contents of the pail from spilling.

The invention consists in the novel construction and combination of the several parts, as will be hereinafter fully set forth and pointed out in the claim.

Reference is to be had to the accompanying drawings forming a part of this specification, in which similar figures and letters of reference indicate corresponding parts in both the views.

Figure 1 is a central vertical section through a milk pail having the improvement applied thereto; and Fig. 2 is a central vertical section through a cover adapted for use upon the pail.

The pail proper A, may be of any desired size, may be of any approved material and may be of any shape that fancy may dictate. Preferably, however, the pail is made round in cross section, and at its upper edge is provided with an annular, outwardly-extending marginal flange or bead 10.

The strainer B, adapted for use in connection with the pail is of similar cross sectional shape to the pail, and the bottom thereof is made to slant downward in direction of its center, the slanting bottom being designated as 11 in the drawings. The slanting bottom meets at its center a downwardly-extending funnel 12, with which the bottom is in direct communication. The lower edge of this funnel is inclined or beveled, and is normally closed by a valve 13, made in the shape of a door and of a size to neatly and completely close the lower end of the funnel, being held normally in that position by a spring 14, attached to the under face of the bottom and bearing against the under face of the valve. The valve at its upper edge, which edge engages with the bottom of the strainer section, is hinged to said bottom in any approved manner.

The body portion of the strainer section, that portion above the bottom, is made in two diameters, the upper portion being of the greatest diameter, whereby an annular exterior offset or shoulder 15, is formed where the body sections of the two diameters meet; and upon the upper portion of the strainer section, upon its outer face, two or more spring latches 16, are secured, adapted to fasten the section to the pail or bucket. An outer marginal flange or bead 17, is preferably produced around the upper margin of the strainer section.

The strainer 18, is secured to the bottom, and the strainer extends entirely over the opening formed in the bottom and communicating with the funnel 12, the strainer being so placed that quite a space 19, will intervene between the lower portion of the bottom and the strainer.

A lid or cover 20, is employed, shown in Fig. 2, which lid or cover is adapted to fit into the strainer section equally as well as in the pail, as the interior diameter of the upper portion of the strainer section corresponds to the diameter of the equivalent portion of the pail. The pail is usually provided with a bail 21.

In making the attachment to the pail, the strainer section is forced down into the pail until its shoulder 15, is brought to bear upon the upper edge of the pail, at which time the spring clasps or latches 16, will have engaged with the rib 10 at the outer marginal portion of the pail, and the strainer section will thereby be firmly held in position. The milk may now be poured or milked into the strainer section, and it will pass down through the strainer 18 and the weight of the milk will be sufficient to open the valve 13. By this means a constant flow of strained milk may be maintained from the strainer section of the pail. In the event the pail should be tipped over, it is evident that the valve 13 will remain closed as it will be held in that position not only by the spring 14 but by the weight of the milk in the pail which will bear against the valve. The object of such an attachment is obvious, but it may be stated that all danger of spilling the milk when in the pail is avoided, and at the time the milk is poured into the pail it is cleansed from all apparent impurities.

Having thus described my invention, I claim as new and desire to secure by Letters Patent,—

A milk pail A, having a rib 10, around its upper edge, a strainer B formed in two diameters, a shoulder 15, at the juncture of the two diameters and resting on the upper edge of the pail, a funnel shaped bottom 11, provided with an outlet 12, a spring pressed valve closing upwardly over said outlet, a strainer 18 in the bottom above said outlet, springs 16 on the outer strainer and curved to engage the rib 10, and a cover 20 adapted to fit the pail or the upper end of the strainer B, substantially as set forth.

WILLIAM R. WATT.

Witnesses:
W. R. REID,
T. B. WILSON.